Oct. 7, 1952 G. J. BURKE 2,613,088
PIPE JOINT
Filed Aug. 15, 1946
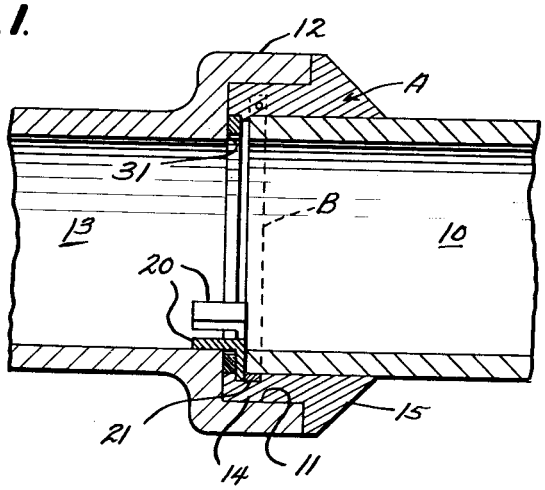
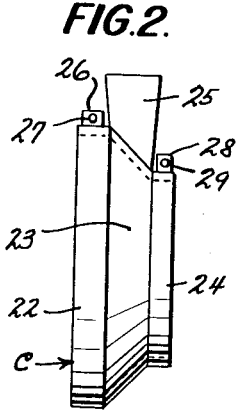
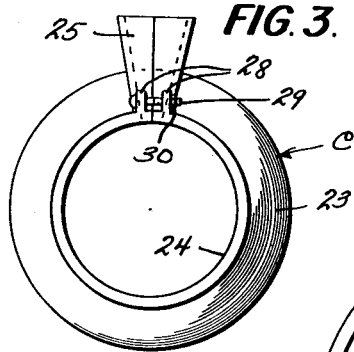
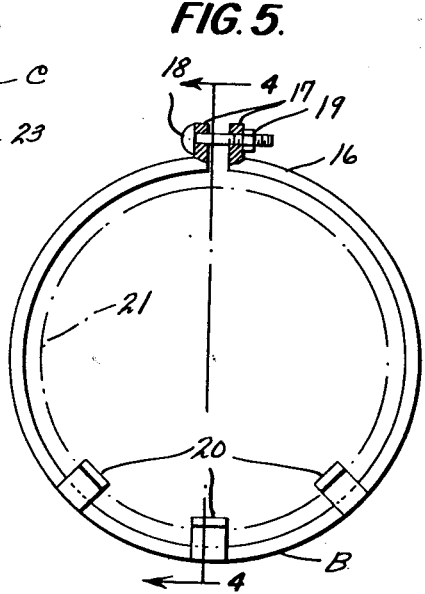
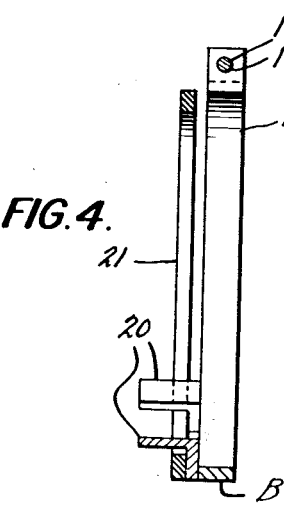
INVENTOR
GEORGE J. BURKE
BY Thomas F. Healy
ATTORNEY Patented Oct. 7, 1952

2,613,088

UNITED STATES PATENT OFFICE 2,613,088

PIPE JOINT

George J. Burke, Arlington, Va., assignor of one-third to William F. Barrett, Arlington County, Va.

Application August 15, 1946, Serial No. 690,662

2 Claims. (Cl. 285—115)

My present invention relates to forms and gaskets, providing for improved pipe joints together with the method of producing them used in the construction of sanitary sewer, storm sewer and drainage pipe lines, etc., wherein a special form and gasket is used to facilitate the laying of pipe lines by eliminating the need for the use of jute as a centering material and by eliminating the use of a runner or "snake" as a form to keep the joint material in place. This invention also provides for the forming of a joint on spigot end pipe by means of a special form and gasket that I have devised.

Heretofore, it has been found necessary to pack the jute or other caulking material into the joint by hand in two or more rings to provide a seal to prevent the inflow of the joint forming liquid into the center of the pipes. These rings of jute or the like were also relied upon to properly center the pipes. This is slow, time consuming work and the results have not proved to be satisfactory.

It is an object of the present invention to overcome these disadvantages of the prior art structures by providing an improved pipe joint which includes a gasket adapted to be mounted around the end portion of a pipe and carrying a band of jute or the like and centering lugs.

Another object of the present invention is to provide an improved method for forming a joint between two pipes which comprises the steps of securing to one end portion of one of said pipes a gasket of split ring formation having a portion bridging the space between the two pipes and engaging the adjacent end of the other of said pipes, surrounding the adjacent end portions of said pipes and said gasket with a split ring mold, and pouring joint material into the space between said mold and said gasket and adjacent end portions of said pipes.

The present invention contemplates the provision of an improved joint between two adjacent pipes comprising a split ring gasket secured to one end portion of one of said pipes and having a portion bridging the space between the two pipes and engaging the adjacent end of the other of said pipes, and joint material sealing the space between the adjacent end portions of said pipes.

A further object of the present invention is to provide an improved mold or form for forming joints between two adjacent pipes comprising a gasket adapted to encircle one end portion of one of said pipes and having a portion for bridging the space between the adjacent ends of said pipes and engaging the adjacent end of the other of said pipes, and a form adapted to encircle the adjacent end portions of said pipes and said gasket in spaced relation thereto, whereby a space is provided for receiving joint material.

With the foregoing and other objects in view, the invention will be hereinafter more fully described and more particularly pointed out in the appended claims.

In the drawings, in which the same parts are denoted by the same reference numerals throughout the several views:

Figure 1 is a fragmentary longitudinal sectional view of two pipes illustrating the improved joints as applied to the bell and spigot ends of adjacent pipes;

Figure 2 is a side elevational view of an improved mold or form for forming the joint shown in Figure 1;

Figure 3 is an end elevational view of the mold shown in Figure 2;

Figure 4 is a sectional view of the improved gasket taken on the line 4—4 of Figure 5, and Figure 5 is an enlarged end elevational view of the gasket.

Referring more particularly to the drawings, 10 indicates a pipe having a spigot end 11 which is adapted to be received by the bell end 12 of a pipe 13. A joint generally indicated at A is formed between the ends 11 and 12 of the pipes and comprises a gasket indicated at B and conventional joint material, such as, cement, bitumen or bituminous compound, having an annular portion 14 disposed between and adhering to the inner face of the bell end 12 and the outer face of the spigot end 11 and a fillet portion 15 adhering to the end of the bell end 12 and to the outer face of the spigot end 11. The outer face of the fillet portion 15 is beveled to deflect roots and the like.

The gasket B is in the form of a split ring 16 and has an apertured ear 17 on each of its free end portions through which extends a bolt 18 having a nut 19 thereon for clamping the gasket around the spigot end 11 of the pipe 10. The ring 16 has mounted thereon angularly spaced apart centering lugs 20 each having a vertical flange which is secured to one face of the ring 16 and a horizontal flange which extends outwardly from and at substantially right angles to the ring. The ring can be made of any appropriate material, such as, tin or the like. A preformed band 21 of resilient material, such as hemp, jute or the like is secured to the same face of the ring 16 on which the lugs are mounted.

The form or mold for forming the joint A is generally indicated at C in Figures 2 and 3 of the drawing and can be made from any appropriate material, such as, tin or the like. The mold C is illustrated in the form of a split ring and comprises an attaching portion 22, a fillet forming portion 23, a dam portion 24 and a pouring gate portion 25. The free ends of the portion 22 have apertured ears 26 for receiving a bolt 27 which is adapted to receive a nut for clamping the portion 22 on the bell end 12 of the pipe 13. The free ends of the portion 24 have apertured ears 28 for receiving a bolt 29 which is adapted to receive a nut 30. The portion 23 is beveled and its free ends are notched out to receive the pouring gate 25.

In the use of the device, the mold C is slipped over the spigot end 11 of the pipe 10 and the gasket B is slipped over the spigot end 11 of the pipe 10 so that the band 21 engages the end thereof. The nut 19 is then tightened until the ring 16 securely engages the outer face of the spigot end 11 of the pipe 10. The spigot end of the pipe will then be inserted into the bell end 12 of the pipe 13 until the band 21 snugly engages the shoulder 31 of the bell end. The lugs 20 will engage the inner wall of the pipe 13 inwardly of the shoulder 31 to properly center the pipe 10 within the bell end. The mold C will then be slid towards the bell end 12 until the end of the bell end 12 contacts the inclined wall of the portion 23 at which time the portion 22 will encircle the bell end. The nuts on the bolts will then be tightened to firmly clamp the mold C on the pipes 10 and 13.

There will be a space provided between the inner face of the bell end 12 and the outer face of the spigot end 11 into which the joint material will be poured through the pouring gate 25. The band 21 will prevent the liquid joint material from passing between the shoulder 31 and the adjacent end of the pipe 10 into the interior of the pipes 10 and 13. The dam portion 24 which is clamped securely around the pipe 10 will prevent the liquid joint material from escaping from the mold and the portion 23 of the mold will form the fillet portion 15 of the joint material. When the joint material has hardened, the mold C will be removed from the pipes by loosening the nuts on the bolts 27 and 29 and spreading the split ring and removing from the pipe. It will be noted from Figure 1 of the drawing that the fillet portion 15 of the joint extends outside of the annular space between the spigot and bell ends of the pipes 10 and 13. This arrangement will provide a greater bond between the ends of the pipes. It is also apparent that the annular portion 14 and the fillet portion 15 of the joint are formed in one pouring operation.

It is obvious that various changes and modifications may be made in the details of construction and design of the above specifically described embodiment of this invention without departing from the spirit thereof, such changes and modifications being restricted only by the scope of the following claims.

I claim:

1. An improved pipe joint between two adjacent pipes having a bell end and a spigot end in juxtaposition comprising, a gasket mounted upon said spigot end and having centering lugs extending therefrom and engaging the inner surface of the pipe having the bell end inwardly of the bell when the pipes are brought into assembled relation, a joint material sealing the space between the adjacent end portions of said pipes, said gasket being in the form of a split ring provided with apertured ears, a threaded bolt disposed in the apertures in said ears, a nut on said threaded bolt, and said gasket being provided with a resilient band for bridging the space between the adjacent ends of said pipes to prevent the joint material when in a fluid state from entering the interior of said pipes.

2. An improved pipe joint between two adjacent pipes having a bell end and a spigot end in juxtaposition comprising, a gasket mounted upon said spigot end and having centering lugs extending therefrom and engaging the inner surface of the pipe having the bell end inwardly of the bell when the pipes are brought into assembled relation, said gasket being in the form of a split ring provided with apertured ears, a threaded bolt disposed in the apertures in said ears, a nut on said threaded bolt, and said gasket being provided with a resilient band for bridging the space between the adjacent ends of said pipes and being adapted to prevent the joint material when in a fluid state from entering the interior of said pipes.

GEORGE J. BURKE.

REFERENCES CITED

The following references are of record in the file of this patent:

UNITED STATES PATENTS

| Number | Name | Date |
| --- | --- | --- |
| 1,284,534 | Wyatt | Nov. 12, 1918 |
| 1,290,205 | Howell | Jan. 7, 1919 |
| 1,452,077 | Weston | July 17, 1923 |
| 1,510,483 | Lang | Oct. 7, 1924 |
| 1,560,931 | Easterday | Nov. 10, 1925 |
| 1,722,324 | Deming | July 30, 1929 |
| 2,156,604 | Payne et al. | May 2, 1939 |
| 2,180,695 | Rembert | Nov. 21, 1939 |
| 2,206,405 | King | July 2, 1940 |
| 2,234,643 | Grant | Mar. 11, 1941 |
| 2,449,731 | Therrien | Sept. 21, 1948 |
| 2,462,348 | Batchler | Feb. 22, 1949 |